(12) United States Patent
Reed

(10) Patent No.: US 10,531,537 B2
(45) Date of Patent: Jan. 7, 2020

(54) HIGH RELIABILITY PHOTOCONTROL CONTROLS WITH 0 TO 10 VOLT DIMMING SIGNAL LINE AND METHOD

(71) Applicant: Express Imaging Systems, LLC, Renton, WA (US)

(72) Inventor: William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 0 days.

(21) Appl. No.: 15/980,978

(22) Filed: May 16, 2018

(65) Prior Publication Data

US 2018/0338367 A1 Nov. 22, 2018

Related U.S. Application Data

(60) Provisional application No. 62/507,730, filed on May 17, 2017.

(51) Int. Cl.
*H05B 37/02* (2006.01)
*H05B 33/08* (2006.01)
(Continued)

(52) U.S. Cl.
CPC ........ *H05B 37/0218* (2013.01); *G01J 1/0271* (2013.01); *G01J 1/44* (2013.01);
(Continued)

(58) Field of Classification Search
CPC .... H01T 2/00; H01T 1/00; H01T 2/02; H01T 13/44; H01T 13/41; H01J 17/00; H01J 2893/0059; H01J 61/56; H01J 65/048; H01J 1/20; H01J 61/327; H01J 5/54; H05B 37/0272; H05B 37/0218; H05B 41/3922; H05B 41/042; H05B 41/34;
(Continued)

(56) References Cited

U.S. PATENT DOCUMENTS

2010/0262296 A1* 10/2010 Davis ..................... G05B 15/02
700/275
2013/0320862 A1* 12/2013 Campbell .............. H05B 37/02
315/152
(Continued)

*Primary Examiner* — Minh D A
(74) *Attorney, Agent, or Firm* — Cozen O'Connor

(57) ABSTRACT

A photocontrol circuit includes a set of light level detection circuitry and a low power consumption power supply that powers the set of light level detection circuitry. In response to a determination that light sensed in ambient environment is at or below the light level threshold, the light level detection circuitry switches a 0 to 10V dimming input line to approximately 10V, controlling a luminaire to emit maximum light. In response to a determination that light sensed in ambient environment is above the light level threshold, the light level detection circuitry switches the 0 to 10V dimming input line to less than approximately 0.5 Volts, thereby controlling the luminaire to emit minimum or no light. The photocontrols embodiments described herein advantageously employ the 0 to 10V dimming line as the luminaire control line, unlike previous photocontrols which typically switch the power input to the luminaire. The photocontrol circuit may be housed in a photocontrol module comprising a base and a cover.

18 Claims, 4 Drawing Sheets

(51) Int. Cl.
*G01J 1/44* (2006.01)
*G01J 1/02* (2006.01)
*G01J 1/04* (2006.01)
*G01J 1/42* (2006.01)

(52) U.S. Cl.
CPC ........ H05B 33/0854 (2013.01); *G01J 1/0407* (2013.01); *G01J 1/4204* (2013.01)

(58) Field of Classification Search
CPC .... H05B 33/0803; H05B 39/09; H05B 41/28; H05B 33/0809; H05B 33/0815; H05B 33/0818; H05B 41/2828; H05B 41/3921; H05B 41/3927; Y02B 20/46; Y02B 20/19; F21V 23/0442
See application file for complete search history.

(56) References Cited

U.S. PATENT DOCUMENTS

2015/0160305 A1\* 6/2015 Ilyes ...................... G01R 31/44
324/414
2016/0295656 A1\* 10/2016 Lenk .................... H05B 33/086

\* cited by examiner

HIGH RELIABILITY PHOTOCONTROL CONTROLS WITH 0 TO 10 VOLT DIMMING SIGNAL LINE AND METHOD

BACKGROUND

Technical Field

The present application is directed to a high reliability, low power consumption, low cost photocontrol and method for use with luminaires equipped with dimming drivers or ballasts, for instance for use with street lights, lights in parking lots and other area lighting or luminaries.

Description of the Related Art

Conventional photocontroller (commonly referred to as "photocontrol" or "photocontrols") typically have an electromechanical relay or solid state switch which is activated in response to a signal produced by a light sensor, which switches the electromechanical relay or solid state switch to power a luminaire during hours of darkness. The resulting inrush current into the driver or ballast causes the relay contacts to have a relatively short lifetime. In the case of solid state switches, the forward drop of the solid state switch causes high power waste according to Ohms law, where a 1.5V forward voltage TRIAC would, for example, waste approximately 1.5 Watts during the On-time of a luminaire consuming 1 Ampere.

Many luminaires are now being built with a dimming standard which is known as 0 to 10V dimming. In particular this dimming standard includes "dim to off" capability, where a voltage of less than 0.5 Volts causes the luminaire to emit no light. A voltage of approximately 10 Volts on the input line causes the luminaire to emit light at full brightness.

An ANSI C136 standard photocontrol socket for use with dimming drivers or ballasts has three contacts for power (Line, Neutral and Switched Line) plus at least two low power contacts for 0 to 10V dimming control. This type of socket has become very common because it allows for the attachment of a wireless control module to the luminaire. The wireless control module may have the capability of dimming the luminaire, and also returning status or asset control data to a centralized computer system. In many cases the luminaire installer does not yet have the control system infrastructure installed at the time of luminaire installation, and consequently uses a standard three contact photocontrol until the wireless module control system is implemented. Some quantity of luminaires may never have a wireless module installed due to the high cost of the wireless module and installation costs.

BRIEF SUMMARY

In the above described situations, a more reliable, low cost photocontrol which uses the 0 to 10V control line will be of great value. The long life of the photocontrol embodiments described herein advantageously matches the long life of solid state (LED) luminaires, thus it becomes much less likely that the luminaire will need to be serviced to replace a faulty photocontrol. The photocontrol embodiments described herein also advantageously have low power consumption, greatly reducing the "vampire" power waste of traditional photocontrols by a factor of, for example 100.

The photocontrols embodiments described herein advantageously employ the 0 to 10V dimming line as the luminaire control line, unlike previous photocontrols which typically switch the power input to the luminaire.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

Figure 1:
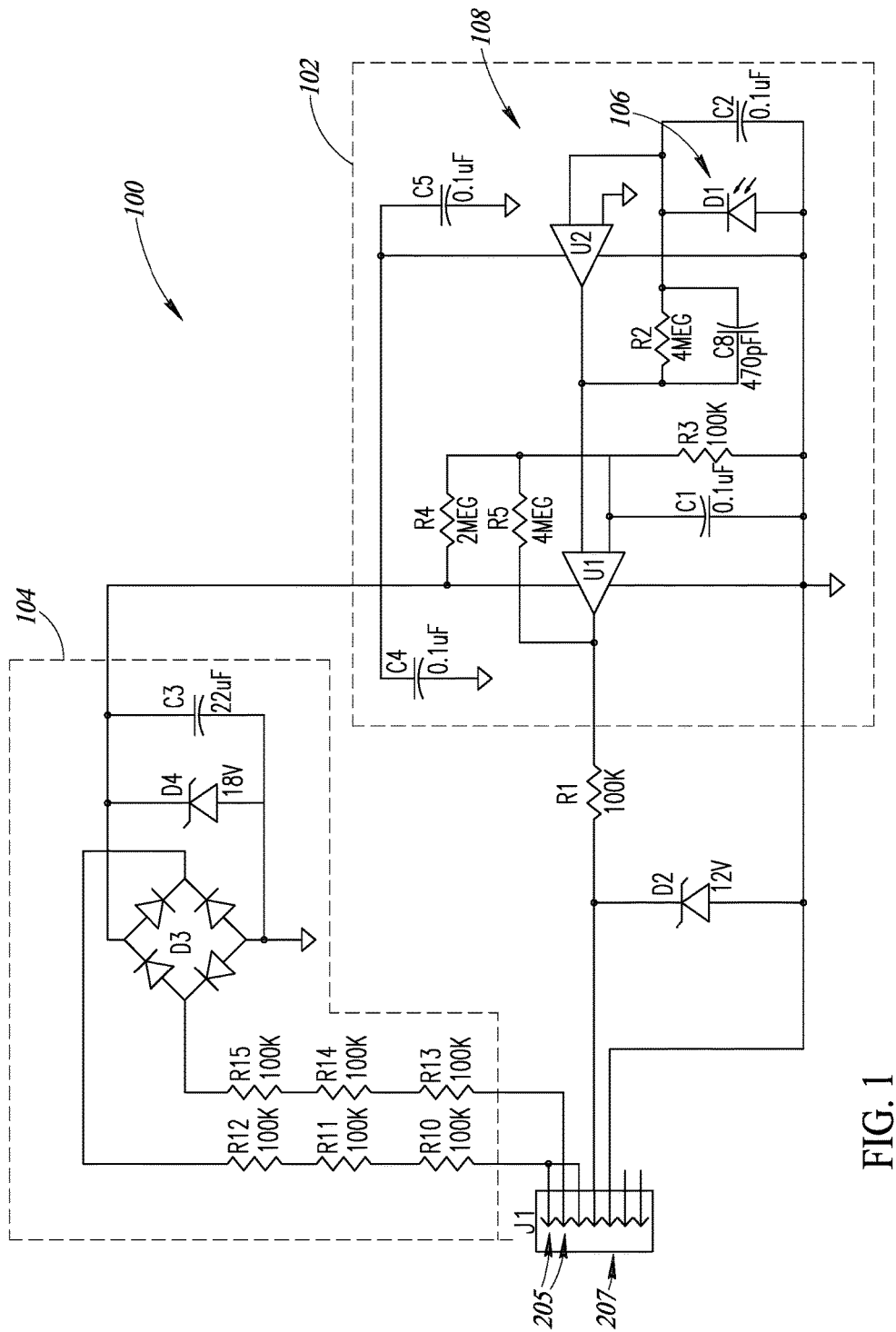
FIG. 1 is a schematic diagram of a photocontroller circuit that includes a low power consumption power supply that powers a set of light level detection circuitry which includes light sensor, and that employs a 0 to 10V dimming line as a luminaire control line, according to at least one illustrated implementation.

FIG. 1 shows a photocontroller circuit 100, according to at least one illustrated implementation.

The photocontroller circuit 100 includes a set of light level detection circuitry 102 and a low power consumption power supply 104 that powers the set of light level detection circuitry 102.

The low power consumption power supply 104 may comprise a diode bridge rectifier D3 with a Zener diode D4 and a capacitor C3 electrically coupled across a pair of output nodes of the bridge rectifier D3. The low power consumption power supply 104 may comprise a first set of resistors R10, R11, R12 and a second set of resistors R13, R14, R15 electrically coupled to respective ones of input nodes of the bridge rectifier D3. The bridge rectifier D3 may receive power by way of the first and second set of resistors R10-R15 via a connector J1.

The set of light level detection circuitry 102 includes one or more light sensors 106 (e.g., photodiodes D1, charge coupled device(s), one or two dimensional image sensors) that detects when ambient light in an external environment is below a light level threshold, for example 1 foot candle. The light sensor(s) 106 is communicatively (e.g., electrically) coupled to an analog comparator circuit 108. Alternatively, or additionally, the set of light level detection circuitry 102 may include one or more processors, for example a microcontroller or microprocessor with an analog or digital interface to the light sensor 106, and firmware processor-executable instructions or data stored on one or more nontransitory processor-readable media. Execution of the firmware processor-executable instructions or data by the microcontroller or microprocessor causes the microcontroller or microprocessor to determine if light detected in the ambient environment is above or below the light level threshold. For example, the light level detection circuitry 102 may include an operation amplifier (Op Amp) U2, for instance a precision rail-to-rail input and output Op Amp, such as an LT6003 available from Linear Technology which draws 1 μA maximum quiescent current. An input (e.g., inverting input pin) of the Op Amp U2 may be coupled to the light sensor(s) 106, and a reference voltage representative of a threshold applied to another input (e.g., noninverting input pin) of the Op Amp U2. Also for example, the light level detection circuitry 102 may include an output comparator U1, for instance a nano-power push-pull output comparator, such as an TLV3701 DBV available from Texas Instruments which draws 560 nA of supply current. An output pin of the Op Amp U2 may be coupled to an input (e.g., inverting input pin) of the comparator U1. The light sensor(s) 106 may also be coupled to the input (e.g., inverting input pin) of the comparator U1. A reference voltage may be applied to another input (e.g., noninverting input pin) of the comparator U1.

In response to a determination that light sensed in ambient environment is at or below the light level threshold (e.g., night time), an output of the set of light level detection circuitry 102 switches the 0 to 10V dimming input line to approximately 10V during nighttime, thereby controlling the luminaire to emit maximum light. In response to a determination that light sensed in ambient environment is above the light level threshold (e.g., day time), an output of the set of light level detection circuitry 102 switches the 0 to 10V dimming input line to less than approximately 0.5 Volts, thereby controlling the luminaire to emit minimum or no light.

The photocontroller circuit 100 includes at least three electrical power input contacts. A Line contact and a Switched Line contact are electrically connected together (shorted) so that the luminaire is always powered by mains power. The same connector also has the 0 to 10V dimming input and return line. The other two connections in the ANSI C136 standard may be used for other purposes such as presence (e.g., motion) detection, or not.

Figure 2:
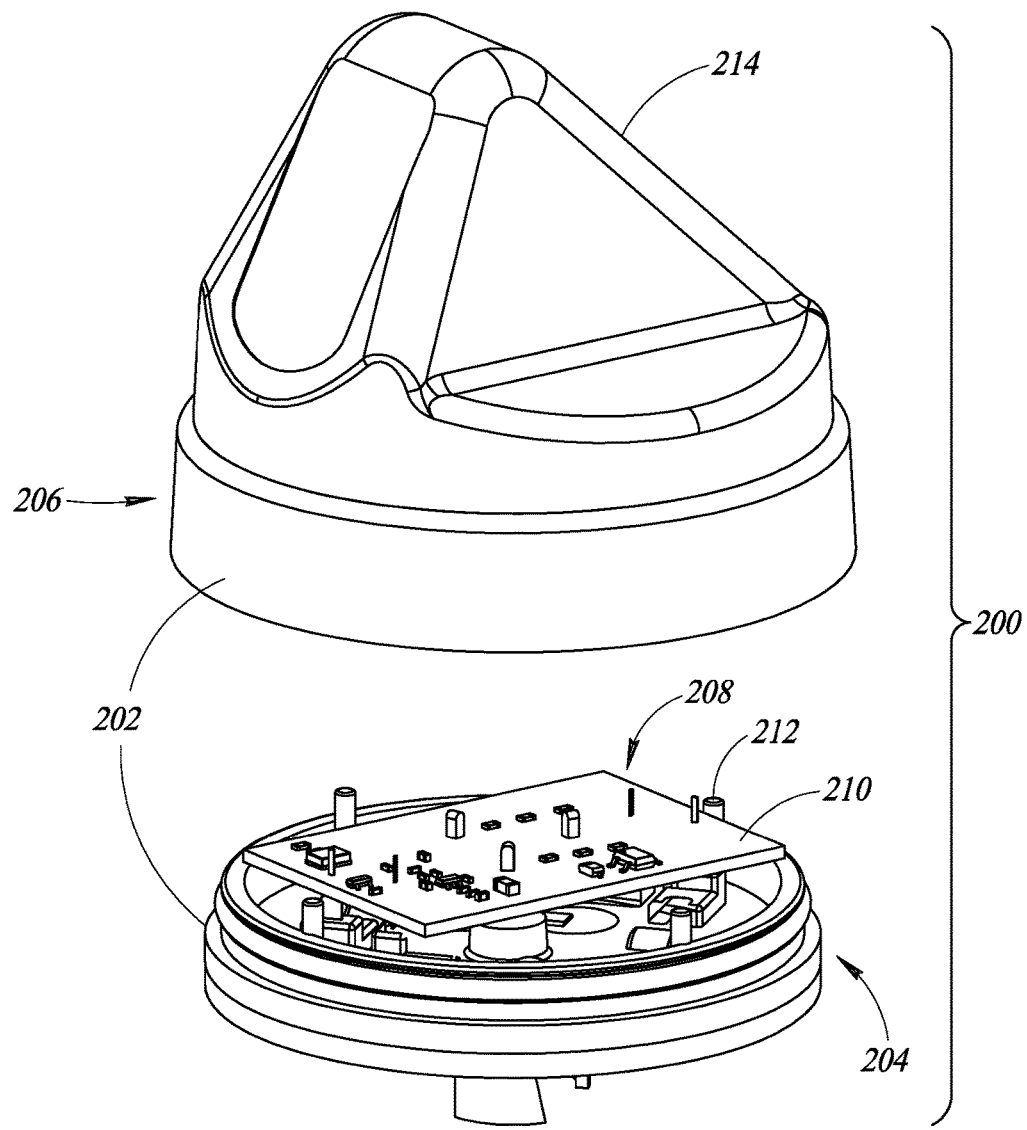
FIG. 2 is a side, front, top isometric view of a photocontrol module including a housing comprising a base and a cover, the cover illustrated as removed from the base, the module also including a set of photocontroller circuitry housed by the housing, according to at least one illustrated implementation.
Figure 3:
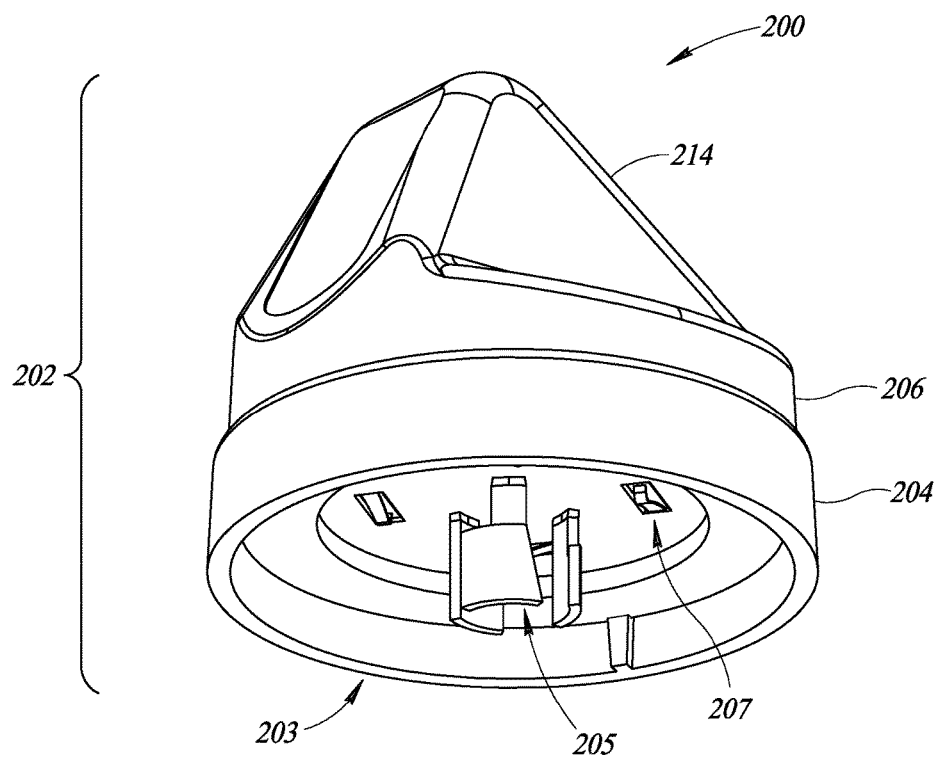
FIG. 3 is a side, front, bottom isometric view of the photocontrol module of FIG. 2 with the cover illustrated as attached to the base, and better illustrating a set of contacts of the set of photocontroller circuitry accessible from the base.
Figure 4:
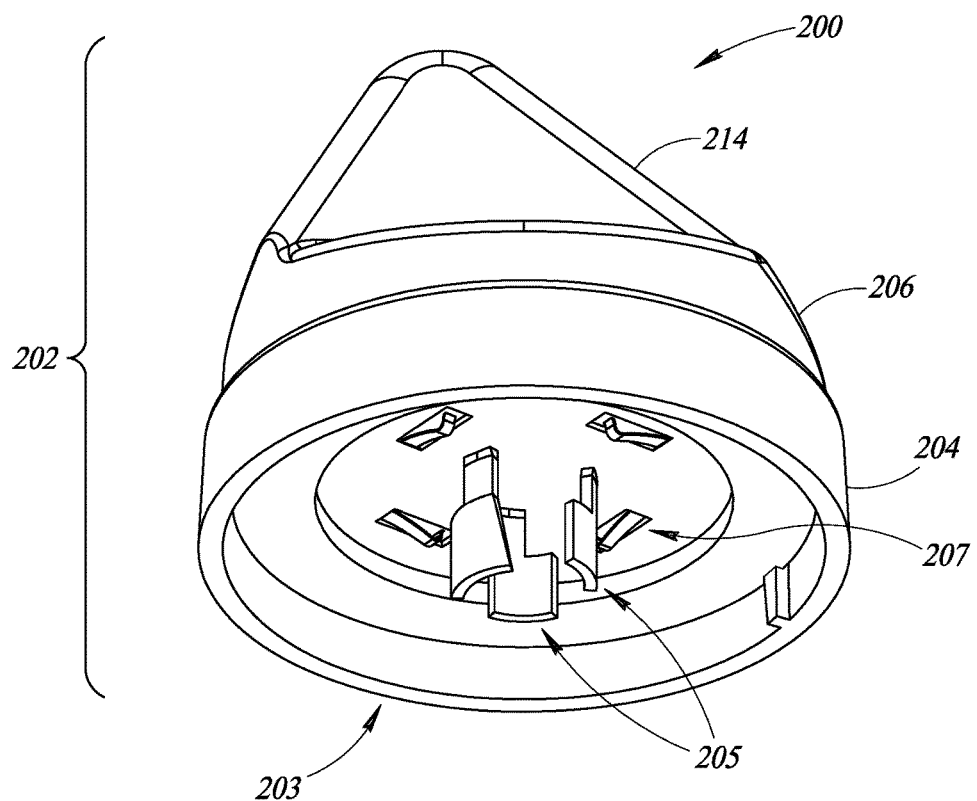
FIG. 4 is a side bottom isometric view of the photocontrol module of FIGS. 2 and 3 with the cover illustrated as attached to the base, and better illustrating the set of contacts of the set of photocontroller circuitry accessible from the base.

FIGS. 2-4 show a photocontrol module 200 including a housing 202 comprising a base 204 and a cover 206, according to at least one illustrated implementation. In particular, FIG. 2 shows the cover 206 illustrated as removed from the base 204 to better illustrate a set of photocontroller circuitry 208 housed by the housing 202. FIGS. 3 and 4 show a bottom 203 of the base 204 of the photocontrol module 200, to better illustrate a set of power contacts 205 (e.g., pins 1-3 of connector J1, FIG. 1) and signal contacts 207 (e.g., pins 4, 5 of connector J1, FIG. 1), accessible from the bottom 203 of the base 204 or housing 202. The photocontrol module 200 can employ any of the structures and methods described in U.S. patent application Ser. No. 15/496,985, filed Apr. 25, 2017.

The set of photocontroller circuitry 208 may be similar or even identical to the set of photocontroller circuit 100 (FIG. 1).

In at least one implementation, the photocontrol module 200 may include a printed circuit board (PCB) 210 which includes one or more electrically insulative layers and one or more electrically conductive traces, and which carries some or all of the circuitry. In some implementations, the photocontrol module 200 may advantageously include a single PCB 210. The PCB 210 may include a number of surface mount devices (SMD) or surface mount components 212 (only one called out in FIG. 2), e.g., for all of the electrical components illustrated in FIG. 2. The PCB 210 may have one or more conductive traces, the conductive traces or components soldered directly to a set of connector contacts.

The housing 202 may be a clear plastic and may provide environmental protection for the PCB 210, as well as protect users from exposure to the circuitry 208 and possible electrical shock. The housing 200 may include one or more light directing features 214 (only one called out in FIG. 2), for example molded into the housing 202. The light directing feature(s) 214 may be included so that the photocontrol is more sensitive in one direction than another.

A rotatable socket may be installed in the luminaire so that the photocontrol module 200 may be rotated to a preferred direction, such as the North direction. A secondary light direction element or coating may be inserted or applied to the cover to block or channel ambient light to the Photosensor, to increase the directional response of the photocontrol. The housing 202 is sealed to the contact mounting base to protect the circuitry from water or foreign matter ingress. The housing 202 may be infused with UV protecting chemicals such as the Omnifusion™ process.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Non-provisional patent application Ser. No. 14/806,500, filed Jul. 22, 2015; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872, 964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Patent Publication No. 2011/0310605, published Dec. 22, 2011; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Patent Publication No. 2013/0062637, published Mar. 14, 2013; PCT Publication No. WO2013/040333, published Mar. 21, 2013; U.S. Provisional Patent Application No. 61/567,308, filed Dec. 6, 2011; U.S. Patent Publication No. 2013/0163243, published Jun. 27, 2013; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Non-provisional patent application Ser. No. 14/816,754, filed Aug. 3, 2015; PCT Publication No. WO2014/018773, published Jan. 30, 2014; U.S. Provisional Patent Application No. 61/723,675, filed Nov. 7, 2012; U.S. Patent Publication No. 2014/0159585, published Jun. 12, 2014; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Non-provisional patent application Ser. No. 14/950,823, filed Nov. 24, 2015; PCT Publication No. WO2014/078854, published May 22, 2014; U.S. Provisional Patent Application No. 61/764,395, filed Feb. 13, 2013; U.S. Patent Publication No. 2014/0225521, published Aug. 14, 2014; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Patent Publication No. 2015/0137693, published May 21, 2015; U.S. Provisional Patent Application No. 62/068,517, filed Oct. 24, 2014; U.S. Provisional Patent Application No. 62/183,505, filed Jun. 23, 2015; U.S. Non-provisional patent application Ser. No. 14/869,492, filed Sep. 29, 2015; PCT Application No. PCT/US2015/53000, filed Sep. 29, 2015; U.S. Provisional Patent Application No. 62/082,463, filed Nov. 20, 2014; U.S. Non-provisional patent application Ser. No. 14/869,501, filed Sep. 29, 2015; PCT Application No. PCT/US2015/53006, filed Sep. 29, 2015; U.S. Provisional Patent Application No. 62/057,419, filed Sep. 30, 2014; U.S. Non-provisional patent application Ser. No. 14/869,511, filed Sep. 29, 2015; PCT Application No. PCT/US2015/53009, filed Sep. 29, 2015; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Provisional Patent Application No. 62/264,694, filed Dec. 8, 2015; U.S. patent application Ser. No. 15/496,985, filed Apr. 25, 2017; and U.S. Provisional Patent Application No. 62/507,730, filed May 17, 2017 are incorporated herein by reference, in their entirety. Aspects of the embodiments can be modified, if necessary, to employ systems, circuits and concepts of the various patents, applications and publications to provide yet further embodiments.

The invention claimed is:

1. A photocontroller, comprising:
a set of light level detection circuitry including at least one light sensor responsive to a level of light in an external environment; and
a low power consumption power supply that powers the set of light level detection circuitry, wherein the set of light level detection circuitry applies signals via a 0 to 10V dimming line to control operation of a luminaire without the photocontroller switching a power input to the luminaire itself.

2. The photocontroller of claim 1, further comprising:
a housing comprising a base and a cover, the cover physically coupleable to the base, the housing which houses the set of light level detection circuitry and the low power consumption power supply.

3. The photocontroller of claim 1 wherein the housing is at least partially transparent.

4. The photocontroller of claim 1 wherein the housing includes at least one reflective feature to defines an optical path to the at least one light sensor from an exterior of the housing.

5. The photocontroller of claim 1 wherein the set of light level detection circuitry and the low power consumption power supply are carried by a single printed circuit board, the single printed circuit board housed by the housing and hermetically sealed therein from an external environment.

6. The photocontroller of claim 1 wherein the set of light level detection circuitry is electrically coupled to a set of input power contacts and a set of signal contacts, the input power contacts which carry electrical power to the photocontroller and the signal contacts which carries signals between the luminaire and the photocontroller, the set of input power contacts including a line contact and a switched line contact that are electrically connected together so that the luminaire is powered by a mains power independently of the photocontroller.

7. The photocontroller of claim 1 wherein the set of light level detection circuitry includes a first operational amplifier having a first input coupled to receive a signal from the at least one light sensor and a second input coupled to receive a reference value representative of a first threshold.

8. The photocontroller of claim 7 wherein the first operational amplifier does not draw more than 1 μA of a supply current.

9. The photocontroller of claim 7 wherein the set of light level detection circuitry is includes a second operational amplifier having a first input coupled to receive a signal from the first operational amplifier and a second input coupled to receive a reference value representative of a second threshold.

10. The photocontroller of claim 9 wherein the first input of the second operational amplifier is further coupled to receive a signal from the at least one light sensor.

11. The photocontroller of claim 9 the first input of the second operational amplifier is an inverting input pin of the second operational amplifier and the second input of the second operational amplifier is a non-inverting pin of the second operational amplifier.

12. The photocontroller of claim 9 wherein the second operational amplifier draws less than 1 μA of a supply current.

13. The photocontroller of claim 1 the first input of the first operational amplifier is an inverting input pin of the first operational amplifier and the second input of the first operational amplifier is a non-inverting pin of the first operational amplifier.

14. The photocontroller of claim 1 wherein the photocontroller is devoid of any mechanical relays that control power input to the luminaire itself and devoid of any solid state switches that control power input to the luminaire itself.

15. A method of operation in a photocontroller, the method comprising:

sensing light ambient environment by at least one light sensor;

determining whether the light sensed in ambient environment is at or below the light level threshold;

in response to a determination that light sensed in ambient environment is at or below the light level threshold, switching, by a set of light level detection circuitry, a 0 to 10V dimming input line to a high level approximately 10V; and in response to a determination that light sensed in ambient environment is above the light level threshold, switching, by the set of light level detection circuitry, the 0 to 10V dimming input line to a low level relative to the high level, the switching of the 0 to 10V dimming input line by the set of light level detection circuitry performed without switching power supplied to a luminaire via a mains power source.

16. The method of claim 15 wherein switching a 0 to 10V dimming input line to a high level includes switching the 0 to 10V dimming input line to approximately 10V.

17. The method of claim 15 wherein switching a 0 to 10V dimming input line to a low level includes switching the 0 to 10V dimming input line to less than approximately 0.5 Volts.

18. The method of claim 15 wherein the photocontroller includes at least three electrical power input contacts including a line contact and a switched line contact, and further comprising:

electrically shorting the line contact and the switched line contact together so that the luminaire is always powered by mains power.

* * * * *